United States Patent [19]

Higley et al.

[11] 4,308,145

[45] * Dec. 29, 1981

[54] RELATIVELY THICK POLYCARBONATE MEMBRANES FOR USE IN HEMODIALYSIS

[75] Inventors: Willard S. Higley, Glendora; Paul A. Cantor, Los Angeles; Bruce S. Fisher, Covina, all of Calif.

[73] Assignee: United States of America, Washington, D.C.

[*] Notice: The portion of the term of this patent subsequent to Feb. 21, 1995, has been disclaimed.

[21] Appl. No.: 100,843

[22] Filed: Dec. 6, 1979

Related U.S. Application Data

[63] Continuation of Ser. No. 668,556, Mar. 19, 1976, abandoned, which is a continuation-in-part of Ser. No. 636,062, Nov. 28, 1975, Pat. No. 4,095,108, which is a continuation-in-part of Ser. No. 454,939, Mar. 26, 1974, abandoned.

[51] Int. Cl.³ .................. B01D 31/00; B01D 13/00
[52] U.S. Cl. .................................. 210/646; 210/654; 210/500.2
[58] Field of Search ............... 210/22, 321 B, 500 M, 210/646, 654, 34.3, 500.2

[56] References Cited

U.S. PATENT DOCUMENTS 4,069,151  1/1978  Higley et al. ............ 210/500 M
4,075,108  2/1978  Higley et al. ............ 210/500 M

FOREIGN PATENT DOCUMENTS 1210504  10/1970  United Kingdom ........... 210/500.2
1295585  11/1972  United Kingdom ........... 210/500.2
1365424   9/1974  United Kingdom ........... 210/500.2
1375204  11/1974  United Kingdom ........... 210/500.2
1395530   5/1975  United Kingdom ........... 210/500.2

Primary Examiner—Frank A. Spear, Jr.
Attorney, Agent, or Firm—Lerner, David, Littenberg & Samuel

[57] ABSTRACT

Membranes for hemodialysis prepared from polycarbonate materials have superior transport properties for middle molecular weight molecules than do cellulosic membranes while maintaining approximately the same ultrafiltration rate as cellulosic membranes. A percentage of patients treated using dialysers containing polycarbonate membranes show improved hematocrit and neurobehavioral functions.

14 Claims, 3 Drawing Figures

RELATIVELY THICK POLYCARBONATE MEMBRANES FOR USE IN HEMODIALYSIS

The invention described herein was developed under contract (NIH-70-2100) from the U.S. Public Health Service, Department of Health, Education and Welfare.

REFERENCE TO PRIOR RELATED APPLICATIONS

This application is a continuation of our earlier copending application Ser. No. 668,556, filed Mar. 19, 1976, now abandoned, which is a continuation-in-part of our earlier copending application 636,062, filed Nov. 28, 1975, now U.S. Pat. No. 4,095,108, which is a continuation-in-part of our earlier copending application Ser. No. 454,939, filed Mar. 26, 1974, since abandoned hereby expressly incorporated by reference and relied upon.

FIELD OF THE INVENTION

This invention relates to new and improved polycarbonate membranes which are especially useful for hemodialysis.

BACKGROUND OF THE INVENTION

Hemodialysis membranes for use in the artificial kidney are at the present time generally made of cellophane materials. The best of these materials currently available for such purpose has been found to be a cellulose regenerated from a cuproammonium solution, plasticized with glycerol and identified by the trademark "Cuprophan". Although Cuprophan membranes provide ultrafiltration rates and clearance of low molecular weight solutes within the desirable ranges for proper hemodialysis, they still have many deficiencies which prevent them from being completely satisfactory as hemodialysis membranes. Certain toxins which it is thought necessary to remove from the blood by hemodialysis are "middle molecules", i.e., molecules of molecular weights in the range of 300 to 5,000. Such middle molecules pass through Cuprophan membranes at rates much slower than is desirable. Babb et al ("The Genesis of the Square Meter-Hour Hypothesis" Trans. ASAIO, Vol.XVII, (1971) p. 81-91) advanced the hypothesis that higher molecular weight metabolites (middle molecules) are important uremic toxins. The blood from normal persons does not show the presence of middle molecules while uremic patients exhibit a significant amount of middle molecules, particularly in the range of 300 to 1,500 molecular weight. In testing Babb's hypothesis, it was found that metabolites having a molecular weight less than 300 or greater than 2,000 were not believed to be causing uremic abnormalities and in fact, metabolites in the 300 to 1,500 molecular weight range were the predominant causes of uremic toxicity and neuropathy. (Babb et al "Hemodialyzer Evaluation By Examination of Solute Molecular Spectra" Trans. ASAIO, Vol XVIII (1972) pg. 98-105). Popovich et al, ("The Prediction of Metabolite Accumulation Concomitant With Remal Insufficiency: The Middle Molecule Anomoly" Trans.ASAIO, Vol XX (1974) p 377-387) discuss the results of numerous clinical investigators who explored the connection of neuropathy to middle molecule concentrations. Additionally, the burst and tear strengths of Cuprophan membranes are lower than is desirable in materials employed in hemodialysis and their shelf-life is low, apparently due to migration of plasticizer during storage. Further, the permeability of the Cuprophan membranes has been found to vary from batch to batch and to decrease on aging. Lastly, it is very difficult to cause adhesion between Cuprophan and other materials and between Cuprophan and itself. Thus, it is difficult to utilize improved hemodialyzer designs requiring leak-proof compartments which depend upon the membrane material for sealing off blood from dialysate solution and blood and dialysate solutions from the atmosphere.

The membranes prepared from the present invention are significantly improved over the state-of-the-art materials, e.g., Cuprophan in the following areas.

1. Polycarbonate membranes permit clearance of critical "middle molecules" up to 4 times greater than Cuprophan in comparable tests while exhibiting an ultrafiltration rate of 1.25 to 2 times Cuprophan membranes.
2. The burst strength of polycarbonate membranes is 1.5-2 times that of Cuprophan.
3. The latitude of membrane properties achievable with polycarbonates is considerable and can be arranged in accordance with clinical needs.
4. Polycarbonate membranes are stiffer than Cuprophan in the wet state. This property results in thinner blood layers in dialyzers, more efficient dialysis and lower blood priming volume.
5. Polycarbonates are heat-sealable wet or dry permitting wide latitude in dialyzer design.
6. Due to greater efficiency of dialysis with polycarbonate membranes projections indicate a greatly reduced dialysis time (9 hrs/wk) compared with Cuprophan.
7. Dialysis procedures using polycarbonate membrane have resulted in the improved physical condition of dialyzed patients including increased hematocrit, decreased blood pressure, improved motor nerve conduction velocity and reduction in symptoms of neuropathy.
8. Polycarbonate membranes are up to 36.6% more compatible with blood than are Cuprophan membranes.

In attempting to develop hemodialysis membranes with mechanical and transport properties superior to those of Cuprophan, it has previously been proposed, by two of the present co-inventors, to fabricate membranes of polyether-polycarbonate block copolymers containing a balance of hydrophobic aromatic polycarbonate blocks, which impart toughness, and hydrophilic polyether blocks, which impart water and solute permeability. The polycarbonate system was chosen for dialysis membrane development because of the outstanding mechanical properties shown by commercial polycarbonate, the very low thrombogenicity exhibited by properly heparinized polycarbonate surfaces, the ease of forming this polymer type into various configurations such as films and fibers, and the many synthetic possibilities for chemical modification of the basic aromatic polycarbonate backbone structure to achieve desired membrane transport properties. As disclosed in the "Proceedings of the 5th Annual Contractors' Converence of the Artificial Kidney Program of the National Institute of Arthritis and Metabolic Diseases", U.S. Department of Health, Education and Welfare (1972), pages 32-33, gelled membranes were prepared from polyether-polycarbonate block copolymers by means of the phase inversion technique, i.e., casting a solution of the copolymer in a suitable solvent onto a substrate surface to form a layer which is allowed to dry only partially and which is then immersed in a liquid gelation medium in which the copolymer is insoluble but which is miscible with the solvent, employing chloroform as the casting solvent and methanol as the gelation medium. The gelled membranes resulting from such procedure, while exhibiting considerable superiority over Cuprophan membranes in their permeabilities to solutes in the middle molecule range, were found, however, to possess several drawbacks to their practical use as hemodialysis membranes. First of all, their ultrafiltration rates were 2 to 5 times that of Cuprophan membranes, which would be clinically unacceptable for hemodialysis as presently administered due to the possibility of dehydration of the patient occurring during treatment. Secondly, their burst strength was no more, and in many cases, less than that of Cuprophan membranes. Thirdly, attempts at continuous casting of the membrane on production-type machinery in widths suitable for use in commercial hemodialyzers, presented further problems which rendered the methanol gelation procedure impractical for commercial hemodialysis membrane production.

The most serious problem encountered was the frequent occurrence of gross leakage of albumin through the membranes during ultrafiltration testing, and which was found to be attributable to holes or other imperfections in the ultrathin surface of the membrane which forms the barrier between the blood and the dialysate or flushing solution. All of these membranes are referred to as being "anisotropic" or "skinned", which means that their two sides are significantly different from each other, one side being relatively smooth and the other side being relatively rough and porous. The smooth side is the "barrier" layer which faces the blood during hemodialysis and is quite thin, on the order of 0.05 to 0.2 microns. The remainder of the membrane merely functions as a support structure and is about 25 to 30 microns in thickness. The integrity of the barrier layer is crucial to the performance of the membrane in dialysis. Any perforation, puncture or other compromise of the integrity of the barrier layer destroys the usefulness of the membrane and all materials in contact with the membrane merely leak through. It has now been proven by electron microscopy that the methanol-gelled polycarbonate membranes are formed with their barrier layers on the side of the membrane contacting the casting surface rather than the side of the membrane facing the air during drying. The significance of this fact is that continuous casting of these membranes on production-type machinery involves continuously peeling the delicate barrier layer off of the casting surface during the process, making it almost impossible to maintain the integrity of the barrier layer and obtain a membrane suitable for use in hemodialysis. Also, it was found that long term exposure of the membrane to methanol affects the membrane properties, thereby necessitating the quick and extensive flushing or washing of the membrane to remove the methanol therefrom and replace it with water in order for the membrane to have adequate shelf-life. One additional problem presented was the impracticality of employing large volumes of methanol as the gelation medium due to the cost, toxicity and flammability of this material.

Membranes of polycarbonate type have been made by other investigators such as suggested in British Patent Specification No. 1,395,530, but these membranes have been found unsuitable for hemodialysis purposes. See also Kesting, *J. Macromol, Sci. (Chem)*, A4(3), pp. 655-664 (1970); U.S. Pat. Nos. 2,964,794, 3,031,328, 3,450,650, 3,526,588 and 3,655,591; and British Patent Specification No. 1,059,945.

It is therefore an object of the present invention to provide hemodialysis membranes having improved permeability to solutes in the middle molecule range as compared with presently available hemodialysis membranes, while maintaining low molecular weight solutes.

Another object of the invention is to provide hemodialysis membranes having improved burst and tear strengths as compared with presently available hemodialysis membranes.

A further object of the invention is to provide hemodialysis membranes having improved shelf-life as compared with presently available hemodialysis membranes. A further object of the present invention is to provide hemodialysis membranes having improved sealability over presently available hemodialysis membranes making possible leak-proof hemodialyzer compartments through simple heat-sealing of the membranes.

Still another object of the invention is to provide a process for producing gelled polycarbonate membranes useful for hemodialysis and having the improved properties as set forth in the preceding objects, which is easily and economically adaptable to large scale machine production without impairing the integrity of the barrier layer of the membrane.

SUMMARY OF THE INVENTION

The above and other objects may be achieved in accordance with the present invention by producing a gelled polycarbonate membrane from a polyether-polycarbonate block copolymer by the phase inversion technique employing an aqueous gelation system with water as the gelling medium and a water-miscible organic solvent as the casting solvent. More specifically, this process comprises casting on to a substrate surface having a smooth finish, a layer of casting solution comprising a polyether-polycarbonate block copolymer containing from about 5 to about 35% by weight of the polyether component and a water-miscible organic solvent together with a co-solvent which acts as a swelling agent for the copolymer, drying the layer to partially evaporate the solvents therefrom, immersing the partially dried layer in water to form a gelled membrane, and stripping the resulting gelled membrane from the substrate surface.

In accordance with another aspect of the present invention, the gelled polycarbonate membrane produced by the above-described process is a hydrophilic polycarbonate copolymer including from 5 to 35 percent by weight of repeating alkylene ether carbonate units and from 95 to about 65 percent by weight of repeating bisphenol A-carbonate units, and the copolymer has a molecular weight within the range of from 200,000 to about 750,000 as determined by intrinsic viscosity measurements. These membranes have a thickness of between about 0.00098 to about 0.00145 inches, and have superior properties when used in a hemodialysis apparatus. In particular, they preferentially remove middle molecular weight molecules from blood, and the membranes themselves have a diffusive permeability measured at 37° C. to sodium chloride of about 630 to 750 cm/min. $\times 10^{-4}$, a permeability to urea of about 665 to 815 cm/min. $\times 10^{-4}$, a permeability to vitamin $B_{12}$ of about 90 to 110 cm/min.$\times 10^{-4}$, and an ultrafiltration rate of about 2.9 to 5.5 ml/hr/$M^2$/mmHg.

The hemodialysis membranes of the present invention consist of polymers having recurring units of the following formula:

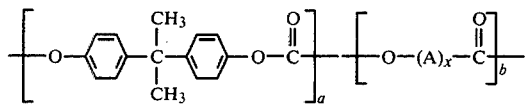

wherein A is —$CH_2CH_2O$— or a combination of

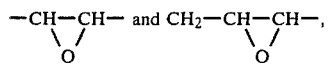

where x is from about 10 to 155, and where a and b are chosen so that the bisphenol A-carbonate unit is about 95 to 65 percent of the weight of the recurring unit and the alkylene ether carbonate unit is about 5 to 35 percent of the weight of the recurring unit. While the polymer molecular weights, membrane thicknesses, diffusive permeabilities and ultrafiltration rates of these preferred membranes are as set forth above, it is preferable that the polymer will have a molecular weight of from about 200,000 to 500,000 as determined by intrinsic viscosity measurements. In addition, it is preferred that x is about 152, b is 1 and a is about 80.

It has been found that gelled polycarbonate membranes produced in this manner, with water as the gelling medium, are formed with their barrier layer on the side of the membrane facing the air during drying, rather than on the side of the membrane in contact with the casting surface as is the case with methanol-gelled polycarbonate membranes, which enables the gelled membrane to be readily stripped from the casting surface without impairing the integrity of the delicate barrier layer, thereby rendering large-scale machine production of such membranes practical. The use of water as a gelling medium in place of methanol also facilitates large scale machine prouction in that water is, of course, less expensive, non-toxic and non-flammable, and also eliminates the necessity for the extensive flushing or washing of the membrane to remove the gelling medium therefrom as was required in methanol gelation. It has also been found that the water-gelled polycarbonate membranes have considerably higher strength than either the methanol-gelled polycarbonate membranes or Cuprophan membranes. Gelled polycarbonate membranes fabricated in accordance with the present invention have furthermore been found to be considerably superior to Cuprophan membranes in their permeabilities to solutes in the middle molecule range while maintaining ultrafiltration rates and clearance of low molecular weight solutes comparable to that of Cuprophan membrane. Moreover, it has been found that the ultrafiltration rates of the membranes fabricated in accordance with the present invention are controllable to levels comparable to those of Cuprophan membranes by proper selection of the molecular weight of the polyether-polycarbonate block copolymer used in fabricating the membrane.

DETAILED DESCRIPTION

Figure 1:
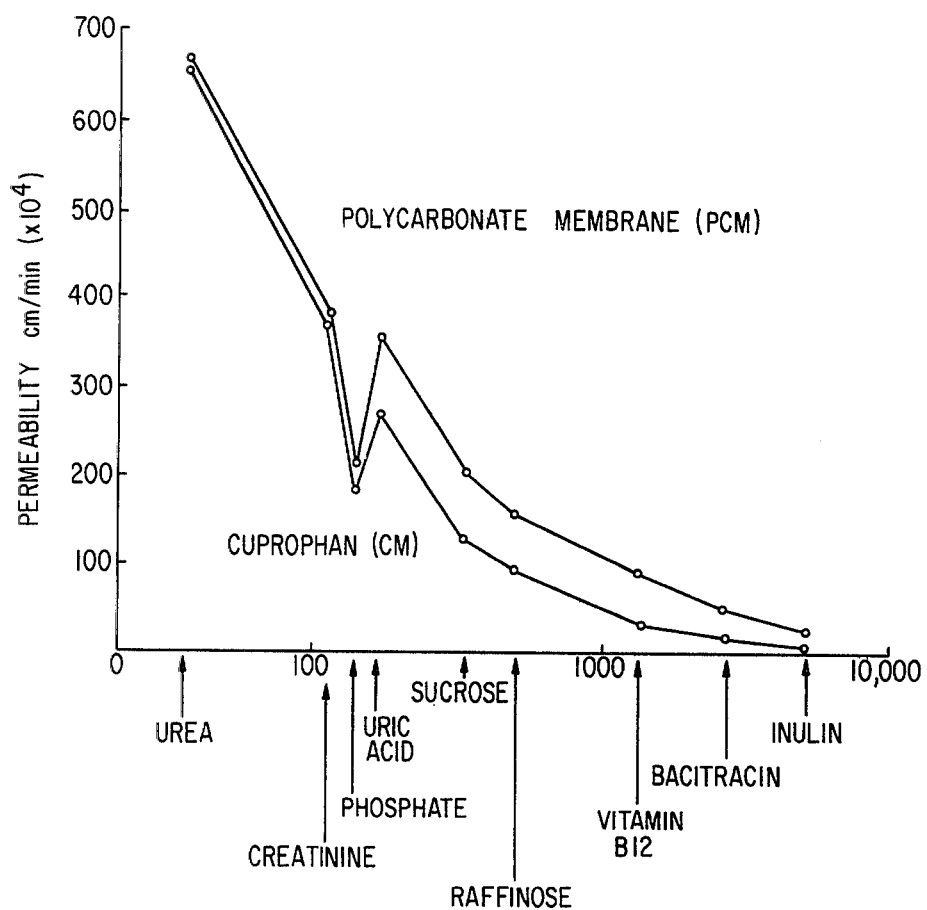
FIG. 1 is a graph comparing the permeability of the present polycarbonate membranes with those of the prior art for permeability to various lower molecular weight and middle molecules.

The polycarbonate material from which the improved hemodialysis membranes are fabricated in accordance with the present invention is a polyether-polycarbonate block copolymer preferably containing from about 5 to about 35% by weight of the polyether component. It has been found that this proportion of polyether blocks renders the normally hydrophobic polycarbonate sufficiently hydrophilic so as to make it suitable for use as a hemodialysis membrane. Certain of such block copolymers may be prepared, for example by the method of Goldberg (*Journal of Polymer Science: Part C*, No. 4, pp. 707–730 (1963)) wherein a comonomer mixture of from about 95 to 65% by weight of 2,2-(4,4'-dihydroxydiphenyl)propane, generally known as bisphenol A, and correspondingly from about 5 to about 35% by weight of a polyether glycol such as polyethylene glycol, is reacted with a carbonic acid derivative such as phosgene. A polyethylene glycol which is found to be particularly suitable is Carbowax 6000, which is a polyethylene glycol having an average molecular weight of 6700, although polyethylene glycols of other molecular weights can also be used, such as, for example, Carbowax 600, Carbowax 1000 and Carbowax 4000, which are polyethylene glycols having molecular weights of 600, 1000 and 4000, respectively.

In accordance with the above the polyether-polycarbonate block copolymer consists of recurring units of the formula

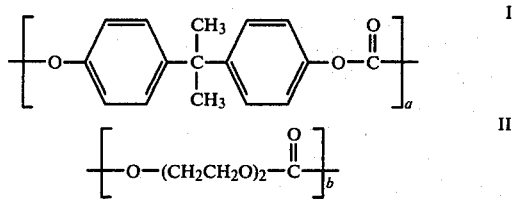

wherein $\chi$ is from about 12 to about 152 and a and b are chosen such that the bisphenol A carbonate unit (I) is about 95 to 65% of the weight of the recurring unit and the alkylene either carbonate unit (II) is about 5 to 35% of the weight of the recurring unit. Polyether glycols other than polyethylene glycols can also be used, such as, for example, polypropylene oxide-polyethylene oxide block copolymers as exemplified by members of the Pluronic diol series such as Pluronic F68.

Polyether-polycarbonate block copolymers having molecular weights ranging from about 50,000 to about 750,000 may suitably be prepared in the above manner. A preferred range of molecular weights if from about 200,000 to about 500,000, since it has been found that membranes fabricated in accordance with the present invention from polyether-polycarbonate block copolymers having molecular weights within such preferred range exhibit ultrafiltration rates comparable to those of Cuprophan membranes and hence within the range clinically acceptable for use in hemodialysis.

Suitable casting solutions for use in producing membranes of the present invention may be prepared by dissolving the polyether-polycarbonate block copolymer in a water-miscible organic solvent for the copolymer. The solvent preferably has a boiling point within the range of 50° to 85° C. for optimum room temperature casting. The preferred solvent is 1,3-dioxolane which has the appropriate combination of high solvent power for the copolymer, suitable vapor pressure at 25° C., water-miscibility and a boiling point of 75° to 76° C. Other suitable solvents which can be employed include 1,3-dioxan, 1,4-dioxan, tetrahydrofuran, butyrolactone, acetonitrile, cellosolve acetate, dimethylformamide, pyridine and mixtures thereof. Chloroform, which was previously suggested for use as a casting solvent in the methanol-gelation of polycarbonate membranes, is not suitable since it is not water-miscible.

The casting solutions are generally formulated to have a total solids content of from about 1 to about 20 weight % to give dopes ranging in viscosity from about 5,000 to about 30,000 cps. Typically, solids contents range from about 10 to about 20 weight % to give viscosities of from about 7,000 to about 25,000 cps, the preferred range. A swelling agent, such as dimethyl sulfoxide, is advantageously added to the casting solution in amounts ranging from about 10 to about 75% by weight of the copolymer, the preferred range being from about 15 to about 25% by weight of the copolymer. The addition of the swelling agent has been found to enhance the permeability of the resulting membrane. Other swelling agents which have been employed include dimethylformamide, dimethylacetamide, acetamide, formamide and pyridine.

Production of the polycarbonate membrane can be effected on a continuous basis by doctor blade casting of the casting solution onto a moving surface having a smooth finish, such as a coated release paper. The well-filtered (10 μm) casting solution is preferably supplied to a hopper placed in front of the doctor blade by means of a positive displacement metering pump. The hopper is provided with end guides for controlling the width of the membrane sheet. The thickness of the membrane sheet is controlled by adjusting the gap between the knife and the moving belt surface, which is usually set so as to give a final membrane thickness of 1.0–1.5 mils.

The freshly cast and wet film is allowed to air dry at temperatures ranging from about 20° to about 30° C. for periods ranging from about 1.0 to about 5.0 minutes to partially evaporate the solvent therefrom, the drying time being determined by both the belt speed and the drying distance. The partially dried film is gelled to produce the final membrane by immersion while still adhering to the moving belt, in a water bath. The gelation bath temperature may be varied between about zero to about 40° C., the preferred range being 20° to 30° C. After gelation, the membrane is peeled from the moving belt and rolled up separately from the belt onto a cylindrical core. The membrane is finally washed thoroughly with deionized water to remove the last traces of solvent and swelling agent and stored in a sealed plastic bag or other container containing water and a sterilant such as formaldehyde. The final thickness of the membrane generally varied from about 1.0 to 1.5 mils, depending upon the knife gap setting, casting solution viscosity and belt speed.

The following examples are given for the purpose of illustrating the present invention.

EXAMPLE 1

A mixture of 491 gm of the polyether-polycarbonate block copolymer obtained by reacting phosgene with a comonomer mixture of bisphenol A (75 wt %) and Carbowax 6000 (25 wt %), and having an intrinsic viscosity of 1.7 (in chloroform at 25° C.) corresponding to a molecular weight of 377,000 3146 gm of 1,3-dioxolane and 98.2 gm of dimethyl sulfoxide, was slowly agitated until solution was effected (approximately 8 hours). The crude solution was filtered in a pressure filter at 30 to 50 psig through a polypropylene felt or 25 μm porosity asbestos sheet medium to remove a small residue of fine insoluble matter. The resulting casting solution has a viscosity of 16,000 cps at 25° C.

Approximately one-half gallon of the above solution was then filtered through a 10 μm inline filter and cast via a doctor blade onto the surface of a 16-inch wide belt moving at a speed of 2.36 feet per minute. The hopper end guides were set to provide a cast film width of 15½ inches and the gap between the doctor knife and the moving belt surface was set at 7.0 mils. These dimensions provide samples suitable for use in the Kiil dialyzer. A total of 2.54 minutes drying time was allowed before gelation of the cast film in a water bath. The ambient air temperature was maintained at 24.7°±0.4° C. and the gelation water bath temperature at 25°±0.5° C. After gelation, the resulting membrane was peeled from the moving belt and rolled up separately from the belt onto a cylindrical core. A total of 177 feet of membrane was thus produced during a period of 75 minutes. The membrane was washed in a flowing stream of deionized water and stored in a sealed polyethylene bag containing 2% aqueous formaldehyde.

The polycarbonate membrane fabricated as above was found to have physical and permeability properties as set forth in Table 1, below. For purposes of comparison, corresponding values are given for a typical sample of Cuprophan PT150 membrane. The permeability properties were determined in a dialysis test cell of the type designed by the National Bureau of Standards.

TABLE 1

| | Polycarbonate Membrane of Example 1 | Cuprophan PT 150 Membrane |
|---|---|---|
| Wet Thickness, mils | 1.3 | 0.9 |
| Relative Burst Strength, Cm Hg. | 30 | 20 |
| Ultrafiltration Rate at 37° C. 200 mm Hg ΔP, ml/m$^2$-hr-mm Hg | 3.6 | 3.9 |
| Diffusive permeability, at 37° C. cm/min (× 10$^4$) (Solute molecular weight in parentheses) | | |
| Sodium chloride (58.4) | 709 | 707 |
| Vitamin B$_{12}$ (1355) | 101 | 46 |
| Human Serum Albumin (60,000) | 0 | 0 |

It can be seen from the data in Table 1 that the polycarbonate membrane fabricated in accordance with the present invention, with approximately 40% greater thickness than the Cuprophan membrane, and approximately the same ultrafiltration rate and permeability towards sodium chloride, a representative low molecular weight solute in blood, exhibits a 50% higher burst strength and a 120% higher permeability toward Vitamin B$_{12}$, a model medium molecular weight solute, while being completely impermeable to serum albumin, a high molecular weight component of blood whose removal from the blood during hemodialysis is not desirable.

It has further been found that the polycarbonate membrane prepared in accordance with the present invention is considerably stiffer in its wet state than Cuprophan membranes. This is of importance in hemodialysis in maintaining a thin blood film, a greater area of blood for dialysis, and a low blood priming volume. Also, the polycarbonate membrane of the present invention is heat sealable, making possible greater latitude in hemodialyzer design. Furthermore, the polycarbonate membrane of the present invention has proven to be non-toxic in a battery of in vitro and animal tests, is blood compatible, and its thrombogenicity is approximately the same as Cuprophan membranes in vitro.

Examination of the polycarbonate membrane prepared in accordance with Example 1, employing water as a gelation medium, by scanning electron photomicrography showed the side of the membrane which was facing the air during drying to be smoother and more regular than the side of the membrane which was in contact with the casting surface, indicating that the membrane was formed with its barrier or active layer on the side of the membrane facing the air during drying rather than on the side of the membrane in contact with the casting surface as was the case with methanol-gelled polycarbonate membranes. Hence, the continuous peeling of the membrane from the moving belt surface has no deleterious effect on the delicate barrier layer of the membrane, making large scale machine production of the membrane feasible. The water-gelled polycarbonate membrane prepared in accordance with Example 1 also appeared to have a much finer and more uniform ultragel structure than a similar membrane prepared by methanol gelation. This is reflected in the considerably higher strength of the water-gelled polycarbonate membranes, which were found to have burst strength 50 to 70% greater than the corresponding methanol-gelled polycarbonate membrane.

EXAMPLE 2

This example serves to illustrate the effectiveness of several cosolvents—swelling agents for enhancing polycarbonate membrane permeability when added to the membrane casting solution formulation.

Casting solutions were prepared from the following formulation, using a polyether-polycarbonate block copolymer obtained by reacting phosgene with a comonomer mixture of bisphenol A (75 wt %) and Carbowax 6000 (25 wt %) and having an intrinsic viscosity (in chloroform at 25° C.) of 1.52 corresponding to a molecular weight of 301,000.

| COMPONENT | WEIGHT - GRAMS |
|---|---|
| Polyether-Polycarbonate Block Copolymer | 40.0 |
| 1,3-Dioxolane | 256.2 |
| Swelling Agent | 8.0 |

Membranes were prepared from each formulation by hand casting under identical conditions on glass plates at room temperature and gelling in water at 25° C. after varying drying periods. The physical and permeability properties found for these membranes are shown in Table 3.

TABLE 2

| Formulation | 1 | | 2 | | 3 | |
|---|---|---|---|---|---|---|
| Swelling Agent | Pyridine | | Dimethyl Formamide | | Dimethyl Sulfoxide | |
| Viscosity, cps at 25° C. | 8570 | | 8090 | | 8500 | |
| Dry Time, Minutes | MEMBRANE PROPERTIES | | | | | |
| 1.75 | 1.54 | 3.51 | 1.48 | 4.14 | 1.60 | Sample |
|  | 40.3 | 538 | 42.4 | 648 | 41.5 | Underdried |
| 2.00 | 1.38 |  | 1.46 |  | 1.48 | 3.79 |
|  | 44.4 | 2.65 |  | 3.55 | 39.1 | 597 |
|  |  | 597 |  | 548 |  |  |
| 2.25 | 1.36 | 3.14 | 1.35 | 2.87 | 1.38 | 3.35 |
|  | 41.7 | 601 | 41.1 | 613 | 42.0 | 516 |

U.F. rate (37° C., 200 mm), ml/m$^2$-hr-mm Hg.
Na Cl Permeability (37° C.), cm/min ($\times$ 10$^4$)

*Key: Thickness, mils
Burst Strength, cm Hg.

The data outlined in Table 3 indicates that, after appropriate adjustment of drying time before gelation, polycarbonate membranes of equivalent strength and permeability characteristics can be prepared through formulation with any one of the three swelling agents, pyridine, dimethyl formamide and dimethyl sulfoxide.

EXAMPLE 3

Several batches of polyether-polycarbonate block copolymer were prepared by reacting phosgene with a comonomer mixture of bisphenol A (75 wt%) and Carbowax 6,000 (25 wt%). These batches were then blended into a single master batch. The resultant blend had an intrinsic viscosity of 1.7 (in chloroform at 25° C.) which corresponds to a molecular weight of 377,000. Each batch of polymer was formulated and cast into membrane in the same manner as Example 1, producing several samples of membrane each approximately 300 to 1,000 ft. long. The thickness, strength and permeability properties of these membranes are listed in Table 4 below:

TABLE 3

| Sample No. | Thickness (0.001″) | Burst (cm Hg) | U.F. Rate (ml/hr/M$^2$/mm Hg) | P NaCl (cm/min $\times$ 10$^4$) | P Urea (cm/min $\times$ 10$^4$) | P B$_{12}$ (cm/min $\times$ 10$^4$) |
|---|---|---|---|---|---|---|
| M-14-38-1 | 1.24 ± 0.05 | 35.3 ± 2.2 | 4.03 ± 0.04 | 713 ± 1 | 796 | 98.9 ± 0.3 |
| M-14-38-2 | 1.25 ± 0.05 | 34.8 ± 1.6 | 4.15 ± 0.10 | 698 ± 15 | 713 | 98.4 ± 0.2 |

TABLE 3-continued

| Sample No. | Thickness (0.001") | Burst (cm Hg) | U.F. Rate (ml/hr/M²/mm Hg) | P NaCl (cm/min × 10⁴) | P Urea (cm/min × 10⁴) | P B₁₂ (cm/min × 10⁴) |
|---|---|---|---|---|---|---|
| M-14-46-1 | 1.28 ± 0.04 | 35.4 ± 1.7 | 4.18 ± 0.54 | 687 ± 8 | 740 ± 15 | 92.5 ± 0.9 |
| M-14-46-2 | 1.31 ± 0.03 | 34.8 ± 1.4 | 4.47 ± 0.25 | 673 ± 7 | 731 ± 6 | 92.7 ± 0.7 |
| M-14-54-1 | 1.38 ± 0.07 | 32.1 ± 1.5 | 5.23 ± 0.29 | 648 ± 19 | 735 ± 16 | 93.4 ± 2.2 |
| M-14-54-2 | 1.39 ± 0.06 | 32.8 ± 1.6 | 5.14 ± 0.39 | 656 ± 27 | 724 ± 5 | 93.1 ± 1.9 |
| M-14-54-3 | 1.40 ± 0.05 | 34.0 ± 1.5 | 4.74 ± 0.01 | 664 ± 20 | 716 ± 13 | 93.2 ± 1.7 |
| M-14-65-1 | 1.18 ± 0.05 | 33.5 ± 1.7 | 4.68 ± 0.43 | 718 ± 0 | 754 ± 35 | 100 ± 1 |
| M-14-65-2 | 1.19 ± 0.05 | 33.2 ± 1.5 | 5.27 ± 0.17 | 714 ± 4 | 742 ± 23 | 106 ± 5 |
| M-14-73-1 | 1.35 ± 0.06 | 36.5 ± 2.4 | 4.54 ± 0.16 | 637 ± 3 | — | 91.4 ± 0.02 |
| M-14-73-2 | 1.36 ± 0.06 | 36.4 ± 2.1 | 4.51 ± 0.19 | 655 ± 21 | — | 91.4 ± 0.02 |
| M-14-80-B | 1.17 ± 0.06 | 37.0 ± 1.9 | 3.43 | 742 | 813 | 99.3 |
| M-14-80-E | 1.17 ± 0.05 | 35.7 ± 0.9 | 3.68 | 746 | 795 | 99.3 |
| M-14-86-B | 1.28 ± 0.08 | 33.6 ± 1.4 | 4.22 | 723 | — | 96.1 |
| M-14-86-E | 1.27 ± 0.07 | 33.5 ± 1.3 | 4.66 | 684 | — | 94.2 |

Toxicological evaluation of these samples revealed that the membrane was non toxic in all implantations, extractions, and animal tests, non toxic in tissue culture, non toxic in all blood tests and showed no absorption of protein. Subsequent evaluation on patients failed to reveal any toxicity.

Table 4 compares the clotting times of polycarbonate membrane of the invention with that of Cuprophan membranes.

TABLE 4

| Lot No. | Clotting Time % of Cuprophan Membrane |
|---|---|
| M-14-16 | 120.3 |
| M-21-21 | 118.0 |
| M-14-54 | 107.8 |
| M-14-46 | 136.6 |
| M-14-65 | 109.5 |

This comparison, using the Lindholm test on the above or similarly prepared membranes demonstrated that the polycarbonate membrane is up to 36.6% more compatible with blood than is Cuprophan.

EXAMPLE 4

Polycarbonate membranes were prepared in the same manner as in Example 3.

Study 1—The permeability of these polycarbonate membranes toward several middle molecules was determined at three different testing facilities. These values are compared in Table 6 with those for Cuprophan membrane, obtained by those facilities using the same procedures and equipment.

The data obtained at Facility 1 is also plotted in FIG. 1. The results of these comparisons, show that the polycarbonate membranes of the invention have a consistently superior permeability for middle molecules than does Cuprophan membrane while maintaining permeabilities comparable to Cuprophan membranes for low molecular weight molecules.

TABLE 5

| MEMBRANE PERMEABILITIES - TEST CELLS cm/min (× 10⁴) | | | | | | |
|---|---|---|---|---|---|---|
| | Facility I | | Facility II | | Facility III | |
| | PCM* | CM** | PCM | CM | PCM | CM |
| UREA (60) | 665 | 654 | 667 | 629 | 696 | 518 |
| CREATININE (113) | 389 | 370 | 423 | 351 | 422 | 319 |
| PHOSPHATE (140) | 210 | 184 | | | 206 | 167 |
| URIC ACID (168) | 355 | 264 | | | 338 | 188 |
| SUCROSE (342) | 201 | 129 | 182 | 135 | 185 | 103 |
| RAFFINOSE (504) | 156 | 97 | | | 141 | 76 |
| VITAMIN B₁₂ (1355) | 92 | 30 | 95 | 42 | 108 | 28 |
| BACITRACIN (1410) | 50 | 17 | | | | |
| INULIN (5200) | 21 | 5 | 23 | 7 | 23 | 6.6 |
| BSP (838) | 230 | 47 | (at 27 c) | | | |
| UF RATE (ml/hr/M²/mmHg) | 4.3 | 3.5 | 4.4 | 3.6 | 2.9 | 2.5 |

*POLYCARBONATE MEMBRANE
**CUPROPHAN MEMBRANE

Study 2—Clearances obtained with these polycarbonate membranes, using D-4 kiil dialyzers, were obtained at four testing facilities. Table 7 lists the results of these evaluations and compares the clearance of the polycarbonate membrane with Cuprophan membrane clearance data obtained at the same facilities using the same equipment.

TABLE 6

| MEMBRANE CLEARANCE - D-4, ml/min | | | | | | | | |
|---|---|---|---|---|---|---|---|---|
| | Facility 1 | | Facility 2 | | Facility 3 | | Facility 4 | |
| | PCM | CM | PCM | CM | PCM | CM | PCM | CM |
| UREA (60) | 120.0 | 124.0 | 121.0 | 122.0 | 117.8* | 120.8* | 100.00* | |
| CREATININE (113) | 91.9 | 86.0 | 102.0 | 103.0 | 96.8* | 106.2* | 99.0* | 94 |
| PHENOBARBITOL (232) | | | | | | | 94.0 | 77 |
| SUCROSE (342) | 67.0 | 60.0 | | | | | | |

TABLE 6-continued

| | MEMBRANE CLEARANCE - D-4, ml/min | | | | | | | |
|---|---|---|---|---|---|---|---|---|
| | Facility 1 | | Facility 2 | | Facility 3 | | Facility 4 | |
| | PCM | CM | PCM | CM | PCM | CM | PCM | CM |
| RAFFINOSE (504) | | | | | 43.2* | 44.8** | 46.1 | 27.7 |
| BSP (838) | | | 117.0 | 43.0 | | | | |
| VITAMIN $B_{12}$ (1335) | 43.0 | 22.0 | 39.0 | 21.0 | 46.5** | 26.0** | 41.5 | 20.6 |
| BACITRACIN (1410) | | | | | | | 30.3 | 15.6 |
| INULIN (5200) | 7.0 | 4.4 | | | 10.1 | | | |

CM = Cuprophan Membrane
PCM = Polycarbonate Membrane
\* In Vivo
\*\* $\frac{At\ Q_F}{} = 5$ ml/min Except for the unexplained difference on raffinose clearance obtained at Facility 3, the evaluations indicate that the polycarbonate membrane exhibits a consistently superior clearance for middle molecules while maintaining the clearance of low molecular weight species, such as urea and creatinine, at approximately the same level exhibited by Cuprophan membranes. The unexpected high clearance as well as permeability of bromo sulfo phthalein (BSP) is explained by the rapid absorption of BSP by the polycarbonate membrane.

EXAMPLE 5

Polycarbonate Membranes were prepared in the same manner as Example 4 and a clinical testing program instituted.

Study 1—Using D-4 Kiil dialyzers twenty-five hemodialysis treatments in 10 patients were performed, without any patient complications necessitating special treatment or hospitalization. The patients were unable to describe any difference in their symptoms during therapy from those experienced during therapy with other dialyzers, using Cuprophan membrane or hollow fiber cellulose acetate membrane. Blood flow during dialysis varied between 102 and 250 ml/min. Clearance of BUN, creatinine, uric acid, and phosphorus increased as blood flow increased, within the limits of flow observed in this study. Arterial pre-dialysis and post-dialysis blood samples showed that hematocrit increased an average of 1.2% and white blood counts decreased an average of 950 cells/cm ($p<0.001$). Platelets did not change significantly. There were no pyrogenic reactions during the study. Ultrafiltration rates varied between 1.5 and 6.7 ml/hr/mm Hg pressure and averaged $4.23\pm0.14$ ml/hr/mm/Hg.

Study 2—A group of six patients who had been on maintenance hemodialysis therapy between nine and sixty months was selected to undergo a double-blind evaluation of polycarbonate membrane. Each patient was clinically stable and had been treated with a variety of hemodialyzers prior to entering the study. There were three adult females and three adult males, aged twenty-two to fifty-two years. Each patient was treated for five hours three times weekly with a D4 Kiil dialyzer. The patients, nurses and physicians were unaware of the type of membrane being used during therapy. Three patients were randomly assigned to begin therapy with Cuprophan membrane; the other three were started with the polycarbonate membrane. Each patient was treated for three months with either Cuprophan or polycarbonate membrane and then switched to the other membrane. During the six months of therapy, the only episode requiring hospitalization was one patient hospitalized for three days with bronchitis. She was undergoing therapy with polycarbonate membrane when hospitalized. The patient's general sense of wellbeing did not change when the two three-month periods were compared.

Figure 2A:
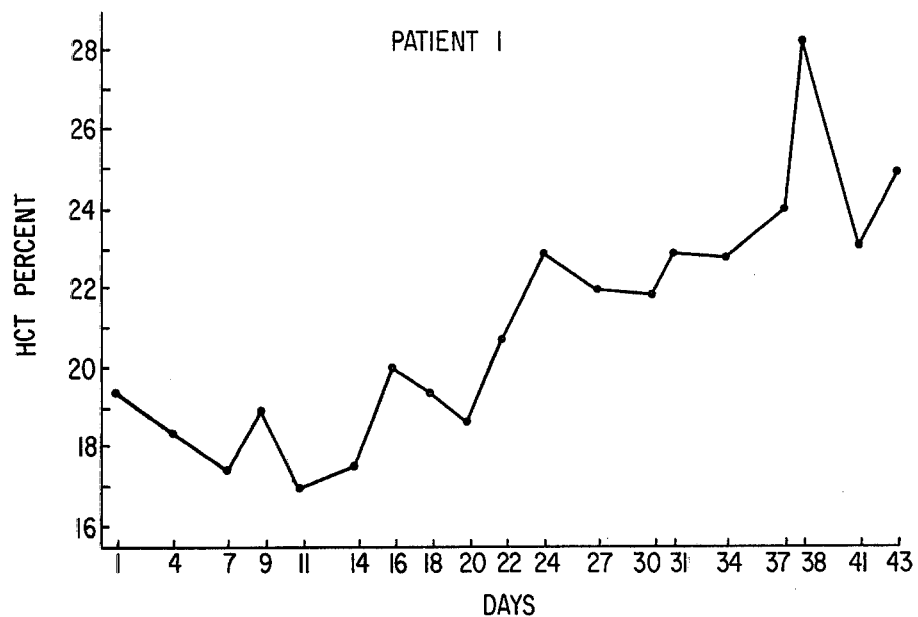
FIG. 2a is a graph of the presence of hematocrit during the course of long term dialysis employing the membrane of the present invention.
Figure 2B:
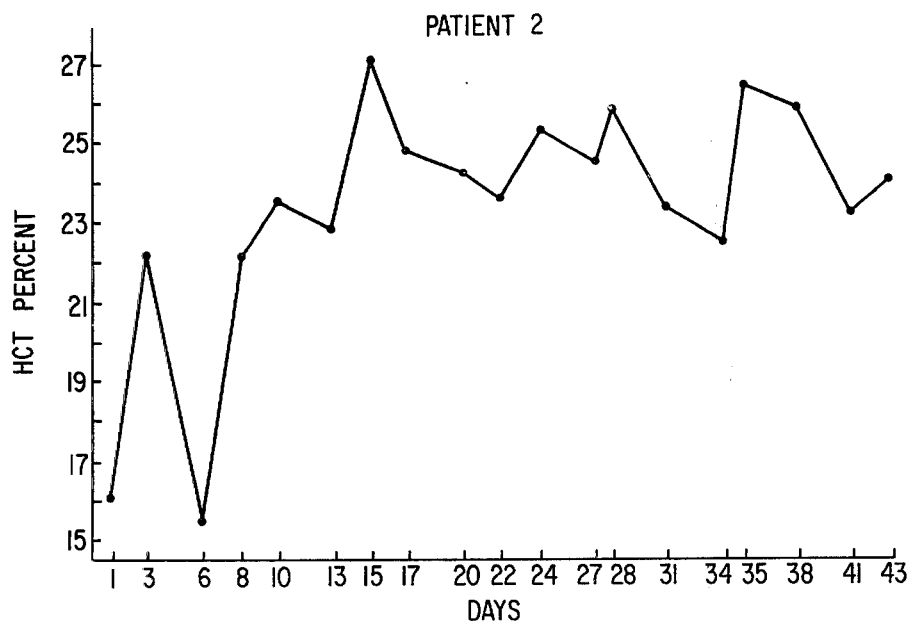
FIG. 2b is a similar graph for another patient.

Pre-dialysis supine arterial pressure was 122/78 during polycarbonate period but 150/96 during Cuprophan membrane therapy ($p<0.001$) in one patient: the others showed no significant change in arterial pressure during each three month period. Pre-dialysis weights were higher during Cuprophan membrane therapy in four patients; two were lower. Two patients showed a small but significant increase in pre-dialysis hematocrit while on polycarbonate membrane, as shown in FIG. 2. Two others had a significantly higher platelet count while on polycarbonate membrane therapy, while two had significantly lower platelet count on polycarbonate therapy. Three patients had higher WBC counts on polycarbonate therapy while two had lower WBC count on polycarbonate therapy. Predialysis serum creatinine was significantly lower in one patient while receiving therapy using Cuprophane membrane. (Mean creatinine 13 PCM, 11 mg/dl Cuprophan). Serum uric acid was higher in two patients while on polycarbonate membrane therapy and in one patient while on Cuprophan membrane. BUN was lower on Cuprophan membrane in one patient, the same one with the lower creatinine. Phosphate was lower on Cuprophan membrane in three patients and lower on polycarbonate membrane in one. Residual renal function remained unchanged in these patients during the six month period of observation.

The clinical condition and laboratory studies did not indicate any deleterious change when patients were treated with polycarbonate membrane as compared to Cuprophan membrane therapy in this six month study. Although individual changes were seen within a given patient, the group of six patients did not consistently show changes either better or worse, in any direction. However, the increased hematocrit observed in two patients and decrease of blood pressure in one patient was highly significant and demonstrates important advantages obtainable using polycarbonate membranes.

Study 3—A clinical evaluation was instituted with the major purposes being to try to reduce patient time on dialysis from the present average of 24 hrs./wk., and still maintain, by present standards, adequate dialysis for the individual patient, and, by more adequate removal of middle molecular weight toxins, to try to reduce some of the remaining complications of chronic dialysis.

The $D_I(MM)$ or Dialysis Index for middle molecular weight solutes for each individual was determined. This $D_I$ (MM) takes into consideration the G.F.R. or the remaining kidney function of the individual patient and the mass area of the individual patient based on height and weight as compared to the minimum weekly volume of middle molecules (with Vitamin $B_{12}$ as a marker) which must be removed from an average sized patient (1.73 $M^2$) to prevent uremic symptoms.

The minimum weekly volume of middle molecules which must be removed $D_I$ (MM) was determined by a retrospective study of four years of accumulated clinical cases where all the known variables were measured relative to the minimum $D_I$ (MM) sufficient to prevent the development of motor nerve conduction velocity (MNCV) reduction for the individual patient:

$$D_I(MM) = \frac{\text{Calculated weekly amount of } MM \text{ removed}}{\text{Minimum weekly amount of } MM \text{ to be removed}}$$

A $D_I$ (MM) of 1 is adequate dialysis, $>$ is overdialysis, and $<1$ is underdialysis.

One of the most sensitive indicators of inadequate dialysis is peripheral neuropathy since it develops and progresses in a seemingly well-dialyzed patient. The first indicator of peripheral neuropathy is "motor nerve conduction velocity" (MNCV) reduction. Having Cuprophan membrane, two patients entered a control phase in which the dialysis schedule for the individual patient produced a $D_I$ (MM) equal to or greater than 1. This was followed by an induction phase in which the $D_I$ (MM) of both patients was lowered to below 0.7 by shortening time on dialysis with the conventional Cuprophan membrane. During this phase, the small molecule concentrations were elevated by about 20%, while middle molecules were elevated as much as 100%. This phase was continued until under dialysis was evident by the appearance of peripheral neuropathy.

The recovery phase was then instituted wherein Cuprophan membrane was replaced by polycarbonate membrane with the same reduced time schedule. Both patients stabilized and then showed improved MNCV after several weeks on polycarbonate membrane treatment. In one patient there was a direct measured confirmation of a lowering of middle molecule levels.

Based on MNCV and EEG and using the Babb-Scribner Charts for Estimating Minimum Adequate Dialysis Times for Patients in Terms of Body Size, GFR and Various Membrane/Dialyzer Combinations, projections were made of the minimum adequate dialysis time for an average body mass man (surface area 1.7 $M^2$) with no kidney function or with no Residual Glomerular Filtration Rate (G.F.R.=0) and partial kidney function (G.F.R.=1). The minimum required time is less than 2/3 of the time required using Cuprophan membrane (Table 8).

TABLE 7

Projections of Minimum Adequate Dialysis Time
(Based on Creatinine and $B_{12}$ Clearances)
(For average Body Mass patient of 5'7", 143 lbs.)

| DIALYZER | G.F.R. = 0 | G.F.R. = 1 |
|---|---|---|
| D-4 Kiil Polycarbonate - $1M^2$ | 12.4 hrs/wk. | 10.5 hrs/wk. |
| Gambro Cuprophan (17μ) - $1M^2$ | 27.3 hrs/wk. | 18.0 hrs/wk. |
| Gambro Cuprophan (13.5μ) - $1M^2$ | 18.6 hrs/wk. | 12.3 hrs/wk. |
| Travenol Cuprophan - $1M^2$ | 18.6 hrs/wk. | 12.3 hrs/wk. |
| Dow 4 - Hollow Fiber Cellulose Acetate - $1M^2$ | 20.4 hrs/wk. | 13.5 hrs/wk. |

QB = 200
QD = 500
QV = 5

Study 4—Two patients were dialyzed for a six month period using Kiil Dialyzers and Cuprophan membrane and baseline data for these patients as listed in Table 8, were obtained. Treatment was then continued with the Cuprophan membrane replaced by polycarbonate membrane. The results obtained after one month's dialysis using polycarbonate membrane, listed in Table 8, show an improvement in neurobehavioral functions with decreases in both urea nitrogen and serum creatinine as well as an increase in hematocrit. All these changes, indicative of an improved medical status of the patient undergoing dialysis, is evidence of more adequate removal of middle molecular weight toxins.

TABLE 8

| | Patient 1 | | Patient 2 | |
|---|---|---|---|---|
| | CM* | PCM*** | CM* | PCM*** |
| Urea Nitrogen, mg % | 85.6 | 80 | 95.15 | 90 |
| Creatinine, mg % | 9.73 | 8.7 | 18.7 | 16.5 |
| Hematocrit, % | 18 | 19.5 | 17–18 | 20–21 |
| Neurophysiological Conditions | | | | |
| EEG* % | 30 | 26 | 13 | 12 |
| CMT | 2–4 | 2 | 14.3 | 15 |
| CPT (Continuous Performance Test) | 52.3 | 55 | 53.3 | 54 |
| CRT | .499 | .443 | .492 | .447 |

*EEG is expressed as percent of 3 to 7 Hz divided by 3 to 13 Hz.
**Cuprophane Membrane; after 6 months treatment
***Polycarbonate Membrane; results are after one month's treatment Use of the polycarbonate membranes of the invention, enable improved transport of middle molecules without substantially varying the levels of ultrafiltration rate and transport of low molecular weight molecules from the desired range, result in improved hematocrit and neurobehavorial functions in patients and allow reduced dialysis times all without toxic reactions or other detrimental effects on the patient. In addition, these polycarbonate membranes are more blood compatible and significantly stronger then Cuprophan membranes.

For further reference, compare the six (6) following reports to the National Institutes of Health, hereby expressly incorporated by reference and relied upon:

[1] Modified Polycarbonate Membranes for Hemodialysis. National Institute of Scientific Research, Rancho Santa Fe, California. Ann. Rept. 1 July 70-31 Dec. 71. PB-213 160/6. This document was received in NTIS (National Technical Information Service) in January, 1973, and was announced in the bi-weekly journal, GRA, Number 2, dated January 25, 1973.

[2] Modified Polycarbonate Membranes for Hemodialysis. National Institute of Scientific Research, Rancho Santa Fe, California. Ann. Rept. 1 Jan.-31 Dec. 72. PB-225 043/9. This document was received in NTIS in January, 1974, and was announced in the bi-weekly journal, GRA, Number 3, dated Feb. 8, 1974.

[3] Modified Polycarbonate Membranes for Hemodialysis. National Institute of Scientific Research, Rancho Santa Fe, California. Rept. 15 June-20 Sept. 69. PB-225 135/3. This document was received in NTIS in December, 1973, and was announced in the bi-weekly journal, GRA, Number 2, dated Jan. 25, 1974.

[4] Modified Polycarbonate Membranes for Hemodialysis. National Institute of Scientific Research, Rancho Santa Fe, California. Ann. Rept. 1 Aug. 73-31 Mar. 74. PB-233 669/1. This document was received in NTIS in August, 1974, and was announced in the bi-weekly journal, GRA, Number 18, dated Sept. 6, 1974.

[5] Modified Polycarbonate Membranes for Hemodialysis. National Institute of Scientific Research, Rancho Santa Fe, California. National Institute of Arthritis and Metabolic Diseases, Bethesda, Maryland. Ann. Rept. 1 Jan.-31 July 73.
PB-235 792/9SL. This document was received in NTIS in October, 1974, and was announced in the bi-weekly journal, GRA, Number 24, dated Nov. 29, 1974.

[6] Modified Polycarbonate Membrane for Hemodialysis. National Institute of Scientific Research, Rancho Santa Fe, California. Final Report Mar. 31, 1974-June 30, 1975. Submitted to the National Institute of Arthritis, Metabolism and Digestive Diseases, National Institutes of Health September 1975.

What is claimed is:

1. A membrane of a hydrophilic polycarbonate copolymer consisting of 5 to 35% by weight of repeating alkylene ether carbonate units and from 95 to about 65% by weight of repeating bisphenol A-carbonate units, said copolymer having a molecular weight within the range of from 200,000 to about 750,000 as determined by intrinsic viscosity measurement, said membrane having a thickness of 0.00098 to about 0.00145 inches and having the properties when used in a hemodialysis apparatus of preferentially removing middle molecule weight molecules from blood, said membrane having a diffusive permeability measured at 37° C. to sodium chloride of about 630 to 750 cm/min×$10^{-4}$, a permeability to urea of about 665 to 815 cm/min×$10^{-4}$, a permeability to vitamin $B_{12}$ of about 90 to 110 cm/min×$10^{-4}$ and an ultrafiltration rate of about 2.9 to 5.5 ml/hr/$M^2$/mm Hg.

2. A membrane as in claim 1 having the property of preferentially passing middle molecular weight molecules from blood such that when one square meter of said membrane is contacted with blood in a dialysis apparatus a patient being treated with said dialysis apparatus can be adequately dialysed in less than 12 hours/week.

3. A membrane as in claim 1 having the property, when used in a dialysis apparatus to dialyse a patient, of causing the hematocrit of the patient to be increased.

4. A membrane as in claim 1 having the propery when used in a dialysis apparatus to dialyse a patient, of causing an improved neurophysiological condition in said patient.

5. The membrane of claim 1 wherein the polycarbonate copolymer consists of 15-35% by weight of repeating alkylene ether carbonate units and 85 to 65% by weight of repeating bisphenol A carbonate units.

6. The membrane of claim 1 produced by wet phase inversion process using an aqueous gelation system.

7. An improved hemodialysis membrane consisting essentially of a polymer having recurring units of the formula

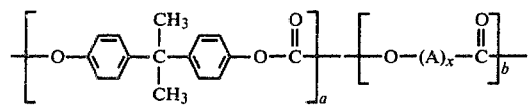

wherein A is selected from the group consisting of —$CH_2CH_2O$— and a combination of —CH—CH—, and $CH_2$—CH—CH—,
   \\ /                    \\ /
    O                       O wherein x is from about 10 to 155 and a and b are such that the bisphenol A carbonate unit is about 95 to 65% of the weight of said recurring unit and the alkylene ether carbonate unit is about 5 to 35% of the weight of said recurring unit, the polymer having a molecular weight of 200,000 to 750,000, and the membrane having a thickness of 0.00098 to about 0.00145 inches, said membrane having a diffusive permeability measured at 37° C. to sodium chloride of about 630 to 750 cm/min×$10^{-4}$, a permeability to urea of about 665 to 815 cm/min×$10^{-4}$, a permeability to vitamin $B_{12}$ of about 90 to 110 cm/min×$10^{-4}$ and an ultrafiltration rate of about 2.9 to 5.5 ml/hr/$M^2$/mm Hg.

8. The membrane as in claim 7 wherein A is —$CH_2$—$CH_2$—O—.

9. The membrane of claim 7 wherein the polymer has a molecular weight of 200,000 to 500,000 as determined by intrinsic viscosity measurement.

10. The membrane of claim 7 wherein the value of x is about 152, b is 1 and a is about 80.

11. A method of dialysing a patient comprising in a closed loop
   (a) removing blood from a patient
   (b) passing said blood through a hemodialyzer wherein the blood is brought into contact with one face of a membrane mounted within said hemodialyzer while a dialysis liquid is simultaneously circulated through the hemodialyzer in contact with the opposite face of the membrane mounted in the hemodialyzer, the flow rates of the blood and dialysis liquid corresponding to the normal conditions of a hemodialysis operation, and
   (c) returning the dialyzed blood to the patient the improvement being the use in the hemodialyzer of a membrane prepared by a wet phase inversion technique using an aqueous gelation system, said membrane being composed of a polyetherpolycarbonate block copolymer having a molecular weight within the range of from about 200,000 to 750,000 as determined by intrinsic viscosity measurement, said polyether-polycarbonate block copolymer containing 5 to 35% by weight of repeating alkylene ether carbonate units and from 95 to about 65% by weight of repeating bisphenol A-carbonate units, said membrane having a diffusive permeability, measured at 37° C., to sodium chloride of about 630 to 750 cm/min×$10^{-4}$, a permeability to urea of about 665 to 815 cm/min×$10^{-4}$, a diffusive permeability to vitamin $B_{12}$, measured at 37° C., of about 90 to 110 cm/min×$10^{-4}$ an ultrafiltration rate, measured at 37° C., of about 2.9 to 5.5 ml/hr/$M^2$/mmHg and a thickness greater than 0.00098 inches.

12. The method of claim 11 wherein blood is brought into contact with one square meter of said membrane, said patient being adequately dialyzed in less than 12 hours/week.

13. The method of claim 11 wherein the hematocrit of the patient is increased.

14. The method of claim 11 wherein the neurophysiological condition of the patient is improved.

* * * * *

UNITED STATES PATENT AND TRADEMARK OFFICE
CERTIFICATE OF CORRECTION

PATENT NO. : 4,308,145
DATED : December 29, 1981
INVENTOR(S) : Willard S. Higley et al It is certified that error appears in the above-identified patent and that said Letters Patent are hereby corrected as shown below:

In the ABSTRACT, in the first line, before "Membranes",
    insert --Relatively thick--.
Column 6, line 45, "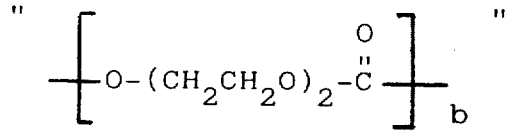"

should read

-- 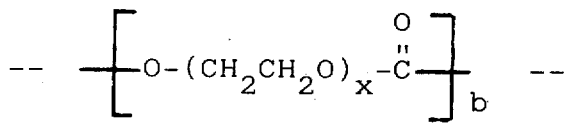 --

Column 10, line 13, cancel "256.2".
Column 10, line 23, "3" should read --2--.
Column 10, line 43, "3" should read --2--.
Column 10, line 62, "4" should read --3--.

Signed and Sealed this

Thirteenth Day of July 1982

[SEAL]

Attest:

*Attesting Officer*

GERALD J. MOSSINGHOFF
*Commissioner of Patents and Trademarks*